NOVEL PHOSPHORODITHIOATES AND METHODS FOR PREPARING THE SAME

Bernard Miller, Stamford, Conn., assignor to American Cyanamid Company, New York, N.Y., a corporation of Maine
No Drawing. Filed May 11, 1960, Ser. No. 28,236
12 Claims. (Cl. 167—22)

The present invention relates to novel phosphorodithioates reprented by the general formula:

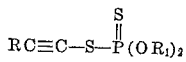

in which R is a lower alkyl or aryl radical and $R_1$ is lower alkyl and method for the preparation thereof.

Phosphorothioate compounds of the present invention, which have the general grouping:

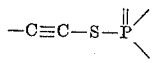

find utility as pesticides and, particularly, as insecticides. They are prepared by admixing in an inert organic solvent and in any desired order, O,O,O',O'-tetraalkyl dithiophosphonothioate having the general structure:

(1)

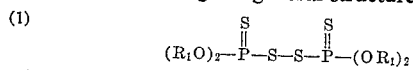

wherein $R_1$ is a lower alkyl radical, and approximately equimolar quantities of an alkali metal salt of a primary acetylene, such as methyl acetylene and phenyl acetylene, conforming to the structure:

(2) $$RC \equiv C-M$$

wherein R is a lower alkyl or aryl radical and M is an alkli metal such as sodium, potassium and lithium. Reaction may be carried out and occurs at temperatures ranging from about 0° C. to about 50° C., and preferably from about 30° C. to 40° C.

Known dithiophosphonothioates which can be employed herein are:

O,O,O',O'-tetramethyl dithiophosphonothioate
O,O,O',O'-tetraethyl dithiophosphonothioate
O,O,O',O'-tetrabutyl dithiophosphonothioate
O,O,O',O'-tetraphenyl dithiophosphonothioate
O,O,O',O'-tetranaphthyl dithiophosphonothioate Illustrative alkali metal acetylides contemplated herein are:

Sodium ethyl acetylide
Lithium phenyl acetylide
Lithium methyl acetylide
Potassium methyl acetylide
Sodium butyl acetylide Suitable inert solvents for the aforementioned reaction include: hexane, cyclohexane, dioxane, ether, xylene, toluene and the like.

The compounds of the present invention are highly active insecticides and may be used as sprays in organic solvents, as emulsions in water or other non-solvents, or on solid carriers, such as talc, clays, diatomaceous earths and the like. Such amounts of inert carrier may be used as are customarily employed in the art. However, the active pesticidal compound is present in amounts ranging from about 0.1% to about 5%, based on the weight of the inert carrier.

In order to facilitate a further understanding of the invention, the following examples are given primarily for purposes of illustrating more specific details thereof. It is to be understood, however, that the scope of the invention is not to be deemed limited thereby, except as defined in the claims. Unless otherwise noted, the parts are by weight.

EXAMPLE 1

*Preparation of O,O-diethyl, S-phenylethynyl phosphorodithioate*

To a solution of 3.8 parts of phenylacetylene (0.03 mol) in 15 parts of volume of anhydrous ethyl ether were slowly added 10 parts by volume of a 3 N butyl lithium in hexane while stirring in a suitable reaction vessel. The mixture is cooled in an ice bath during reaction. Sufficient ether is added to dissolve any precipiated lithium salt. Next, the solution is added slowly to 10 parts of O,O,O',O'-tetraethyl dithiophosphonothioate (0.03 mol). After stirring for an additional hour, the ether solution is washed with water and dried over magnesium sulfate. Evaporation of the solvent yields 7.3 parts of a light brown liquid. The latter is distilled at 12–18 mm. Hg pressure to obtain 4.9 parts of O,O-diethyl, S-phenylethynyl phosphorodithioate having a refractive index of 1.5903–1.5918 at 25° C. Analysis (in percent) of the compound showed the following.

Calculated: P, 10.82; S, 22.38. Found: P, 10.33; S, 22.70.

EXAMPLE 2

*Preparation of O,O-diethyl, S-methylethynyl phosphorodithioate*

Into a suitable reaction vessel is passed methyl acetylene gas into a solution of 25 parts of 3.03 N butyl lithium in hexane (0.076 mol) and 150 parts of ether. The mixture is rapidly stirred and cooled on an ice bath. When formation of lithium methyl acetylide is complete, 25 parts of O,O,O',O'-tetraethyl dithiophosphonothioate (0.06 mol) in 50 parts of ether are added. The mixture is stirred for one-half hour, then refluxed for 15 minutes, cooled and washed with water. The ether solution is then dried over magnesium sulfate. Evaporation of the salt leaves 13.7 parts of a light brown liquid. The latter is distilled at 0.8 mm. Hg pressure yielding 10.8 parts of O,O-diethyl, S-methylethynyl phosphorodithioate having a boiling point of 95–100° C. and an index of refraction at $$25° C. = 1.5236$$

and analyzes as follows.

Calculated for $PS_2O_2C_7H_{13}$: C, 37.50; H, 5.85; P, 13.69; S, 28.55. Found: C, 37.59; H, 6.09; P, 13.75; S, 28.85.

EXAMPLE 3

*Preparation of O,O-dimethyl, S-phenylethynyl prosphorodithioate*

Repeating Example 1 except that O,O,O',O'-tetramethyl dithiophosphonothioate is employed in lieu of the corresponding tetraethyl dithiophosphonothioate derivative, a black liquid, in 95% yield, having a refractive index $n_D{}^{25} = 1.6104$ is obtained.

Other typical phosphorodithioates of the present invention, which are prepared according to the practice of Example 1, are:

O,O-diethyl-S-naphthylethynyl phosphorothioate
O,O-diethyl-S-isopropylethynyl phosphorothioate
O,O-dimethyl-S-n-propylethynyl phosphorothioate
O,O-diethyl-S-n-butylethynyl phosphorothioate
O,O-diethyl-S-tertiarybutylethynyl phosphorothioate As above stated, the compounds of the invention are highly active insecticides. To demonstrate the marked degree of insecticidal activity, each of the products of the above examples are dissolved in a solvent therefor comprising 65% acetone and 35% water at a concentration of 0.01% based on the weight of the compound. The solution is sprayed on Nasturtium aphids and the results of the tests are tabularized below:

TABLE I

| Compound | Percent Kill |
|---|---|
| O,O-Diethyl, S-Phenylethynyl Phosphorodithioate | 49 |
| O,O-Diethyl, S-Methylethynyl Phosphorodithioate | 100 |
| O,O-Dimethyl, S-Phenylethynyl Phosphorodithioate | 50 |

I claim:

1. A phosphorodithioate compound represented by the general formula:

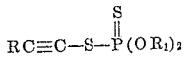

wherein R is a radical selected from the group consisting of lower alkyl, phenyl and naphthyl and $R_1$ is a lower alkyl radical.

2. O,O-diethyl, S-phenylethynyl phosphorodithioate.
3. O,O-dimethyl, S-phenylethynyl phosphorodithioate.
4. O,O-diethyl, S-methylethynyl phosphorodithioate.
5. A method for preparing phosphorodithioates represented by the general formula:

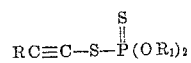

wherein R is a radical selected from the group consisting of lower alkyl, phenyl and naphthyl and $R_1$ is a lower alkyl radical, which comprises: reacting an alkali metal acetylide having the structure:

where R is a radical selected from the group consisting of lower alkyl and aryl and M is an alkali metal, with a dithiophosphonothioate of the structure:

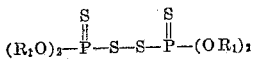

where $R_1$ is a lower alkyl radical.

6. A process according to claim 5 in which the acetylide is lithium phenyl acetylide.
7. A process according to claim 5 in which the acetylide is lithium methyl acetylide.
8. A process according to claim 5 in which the dithiophosphonothioate is O,O,O',O'-tetraethyl dithiophosphonothioate.
9. An insecticidal composition comprising a major amount of inert carrier and a minor but effective amount of a phosphorodithioate represented by the general formula:

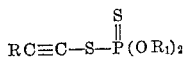

wherein R is a radical selected from the group consisting of lower alkyl, phenyl and naphthyl and $R_1$ is a lower alkyl radical.

10. An insecticidal composition according to claim 9 in which the phosphorodithioate is O,O-diethyl, S-phenylethynyl phosphorodithioate.
11. An insecticidal composition according to claim 9 in which the phosorodithioate is O,O-dimethyl, S-phenylethynyl phosphorodithioate.
12. An insecticidal composition according to claim 9 in which the phosphorodithioate is O,O-diethyl, S-methylethynyl phosphorodithioate.

References Cited in the file of this patent

UNITED STATES PATENTS

| 2,865,801 | Baker et al. | Dec. 23, 1958 |
| 2,906,661 | Baker et al. | Sept. 29, 1959 |

FOREIGN PATENTS

| 1,063,148 | Germany | Aug. 13, 1949 |

UNITED STATES PATENT OFFICE

CERTIFICATE OF CORRECTION

Patent No. 3,019,159                          January 30, 1962

Bernard Miller

It is hereby certified that error appears in the above numbered patent requiring correction and that the said Letters Patent should read as corrected below.

Column 1, line 11, for "reprented" read -- represented --; same column 1, line 35, for "alkli" read -- alkali --; column 2, line 12, for "precipiated" read -- precipitated --; column 3, line 35, strike out "and aryl" and insert instead -- phenyl and naphthyl --; column 4, line 22, for "phosphorodithioate" read -- phosphorodithioate --.

Signed and sealed this 19th day of June 1962.

(SEAL)
Attest:

ERNEST W. SWIDER
Attesting Officer

DAVID L. LADD
Commissioner of Patents